(12) United States Patent
Tao et al.

(10) Patent No.: US 11,737,484 B2
(45) Date of Patent: Aug. 29, 2023

(54) AUTOMATED FRUIT AND VEGETABLE CALYX OR STEM REMOVAL MACHINE

(71) Applicants: California Strawberry Commission, Watsonville, CA (US); University of Maryland, College Park, MD (US)

(72) Inventors: Yang Tao, Potomac, MD (US); John Lin, Cabin John, MD (US); Xin Chen, Taylorsville, MD (US)

(73) Assignees: California Strawberry Commission, Watsonville, CA (US); University of Maryland, College Park, MD (US)

( * ) Notice: Subject to any disclaimer, the term of this patent is extended or adjusted under 35 U.S.C. 154(b) by 33 days.

(21) Appl. No.: 17/100,826

(22) Filed: Nov. 21, 2020

(65) Prior Publication Data
US 2021/0076728 A1    Mar. 18, 2021

Related U.S. Application Data

(63) Continuation of application No. 16/377,946, filed on Apr. 8, 2019, now Pat. No. 10,925,307, which is a
(Continued)

(51) Int. Cl.
*A23N 15/02* (2006.01)
*B26D 5/00* (2006.01)
(Continued)

(52) U.S. Cl.
CPC .............. *A23N 15/02* (2013.01); *A23L 19/03* (2016.08); *B26D 5/00* (2013.01); *B26D 5/007* (2013.01);
(Continued)

(58) Field of Classification Search
CPC ........... A23N 15/02; A23L 19/03; B26D 5/00; B26D 5/007; B26D 5/34; B26D 7/0625; B26F 3/004
See application file for complete search history.

(56) References Cited

U.S. PATENT DOCUMENTS 1,964,275 A * 6/1934 Secondo ................ A23N 12/02
                                                    15/3.13
4,122,766 A * 10/1978 Ledebuhr ............... A23N 15/02
                                                    198/755
(Continued)

FOREIGN PATENT DOCUMENTS

| JP | 2006116688 | * | 5/2006 |
| JP | 5366165 | * | 12/2013 |
| WO | WO03047371 | * | 6/2003 |

OTHER PUBLICATIONS

Translation for JP5366165 published Dec. 2013.*
Abstract for WO03047371 published Jun. 2003.*

*Primary Examiner* — Anthony J Weier
(74) *Attorney, Agent, or Firm* — Rutan & Tucker LLP; Hani Z. Sayed

(57) ABSTRACT

A system and methods are provided for removal of undesired portions of a fruit or vegetable, such as removal of calyxes from strawberries before they are flash frozen. An automated process for high-throughput fruit or vegetable calyx removal includes a loading system, an identification system, and a removal system. The loading system is configured to transport the fruit or vegetable through the automated process. The loading system may also orient the fruits or vegetables along an axis of the fruit and or align the fruit or vegetables in a desired pattern, orientation, and/or arrangement. The identification system is configured to locate the calyx and determines calyx position data and an optimal cutting path for individual fruit. The removal system uses data received from the identification system to separate the calyx from the fruit or vegetable.

6 Claims, 9 Drawing Sheets

Related U.S. Application Data continuation of application No. 15/152,400, filed on May 11, 2016, now Pat. No. 10,285,429, which is a continuation of application No. 14/212,181, filed on Mar. 14, 2014, now Pat. No. 9,364,020.

(51) Int. Cl.
    *B26D 5/34*     (2006.01)
    *B26D 7/06*     (2006.01)
    *B65F 3/00*     (2006.01)
    *A23L 19/00*     (2016.01)
    *B26F 3/00*     (2006.01)

(52) U.S. Cl.
    CPC ............. *B26D 5/34* (2013.01); *B26D 7/0625* (2013.01); *B26F 3/004* (2013.01)

(56) References Cited

U.S. PATENT DOCUMENTS

| | | | | |
|---|---|---|---|---|
| 5,590,591 | A * | 1/1997 | Kim | A23N 4/12 |
| | | | | 99/635 |
| 5,855,270 | A * | 1/1999 | Throop | A23N 15/00 |
| | | | | 209/912 |
| 9,364,020 | B2 * | 6/2016 | Tao | B26D 7/0625 |
| 10,285,429 | B2 * | 5/2019 | Tao | A23L 19/03 |
| 10,925,307 | B2 * | 2/2021 | Tao | B26D 5/00 |
| 2008/0289515 | A1 * | 11/2008 | Knorr | G01N 21/85 |
| | | | | 460/134 |

* cited by examiner

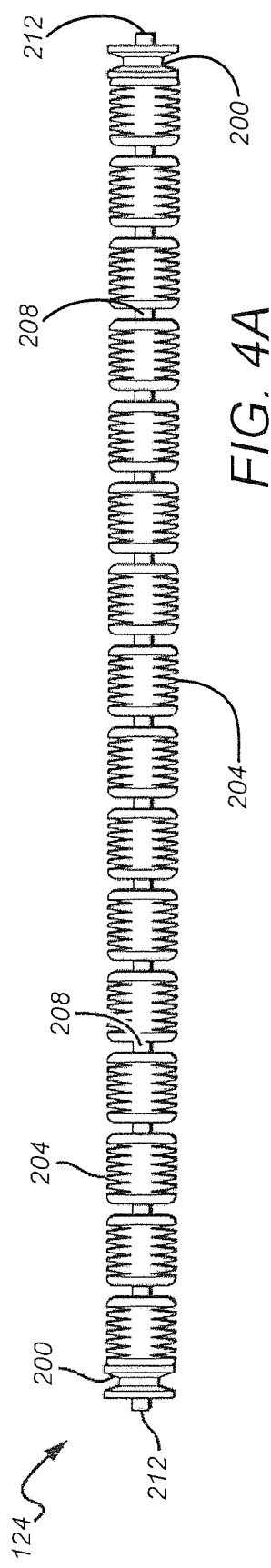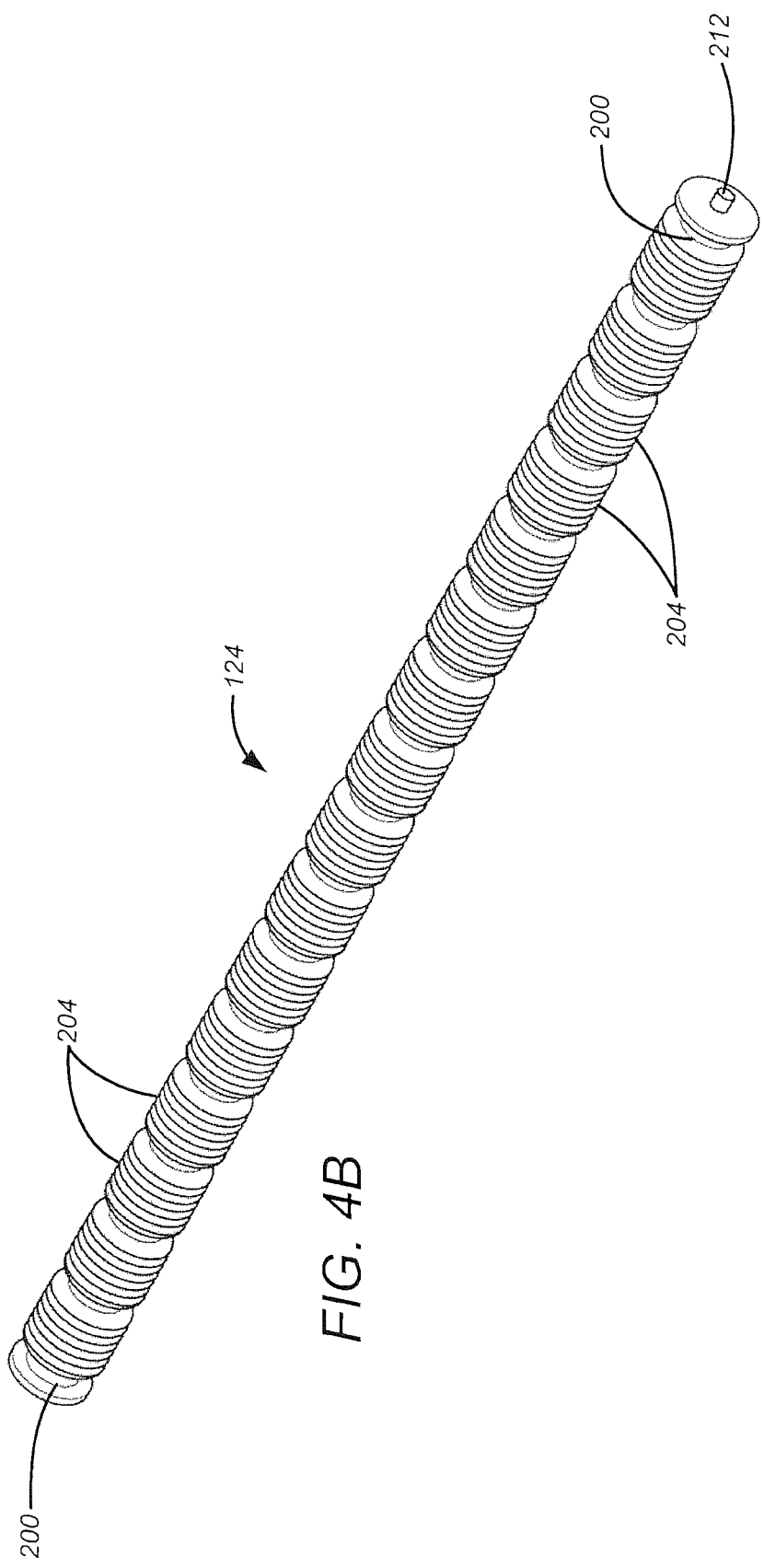

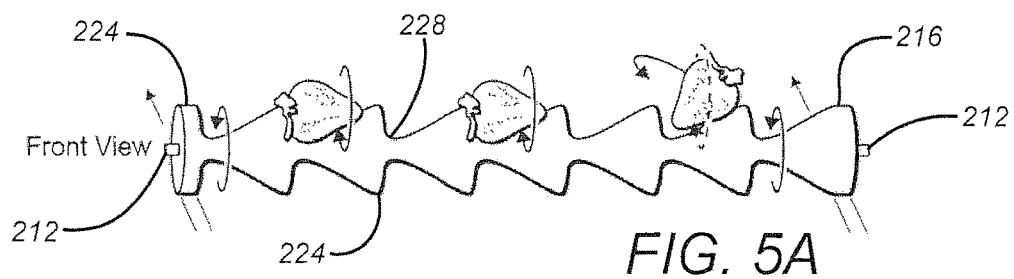
FIG. 5A
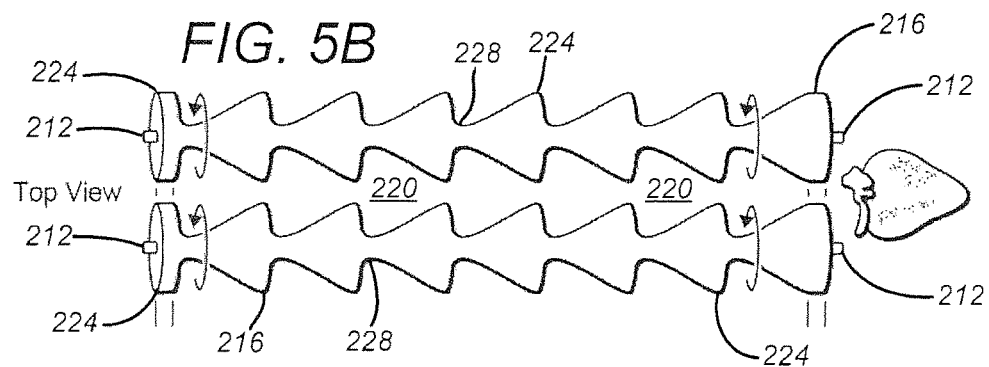
FIG. 5B
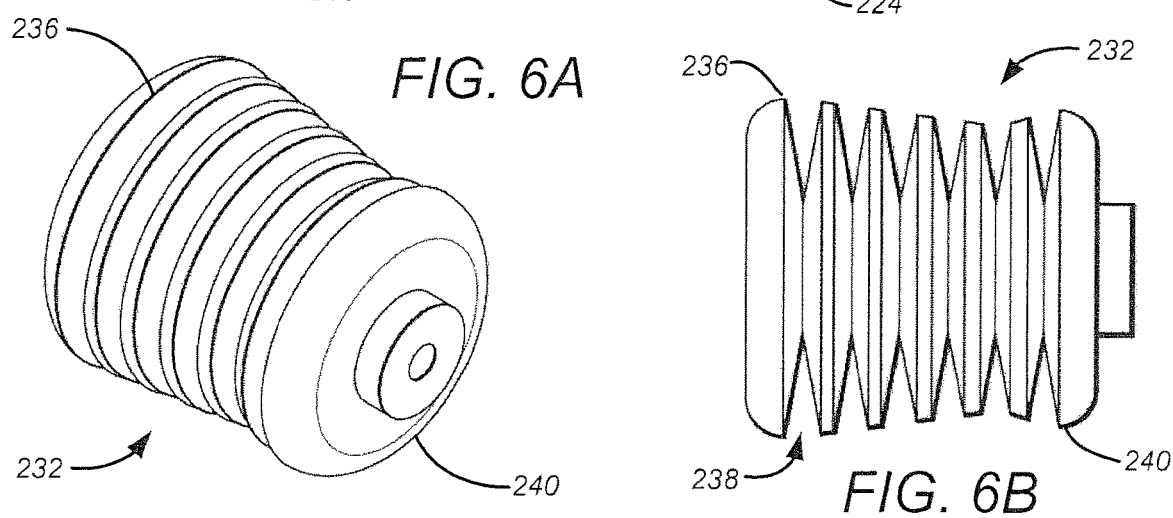
FIG. 6A
FIG. 6B
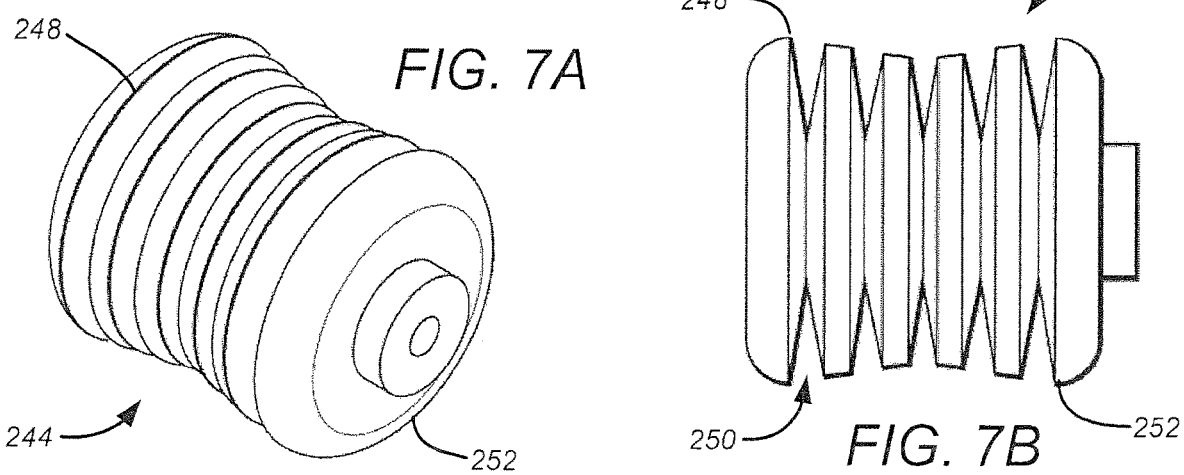
FIG. 7A
FIG. 7B

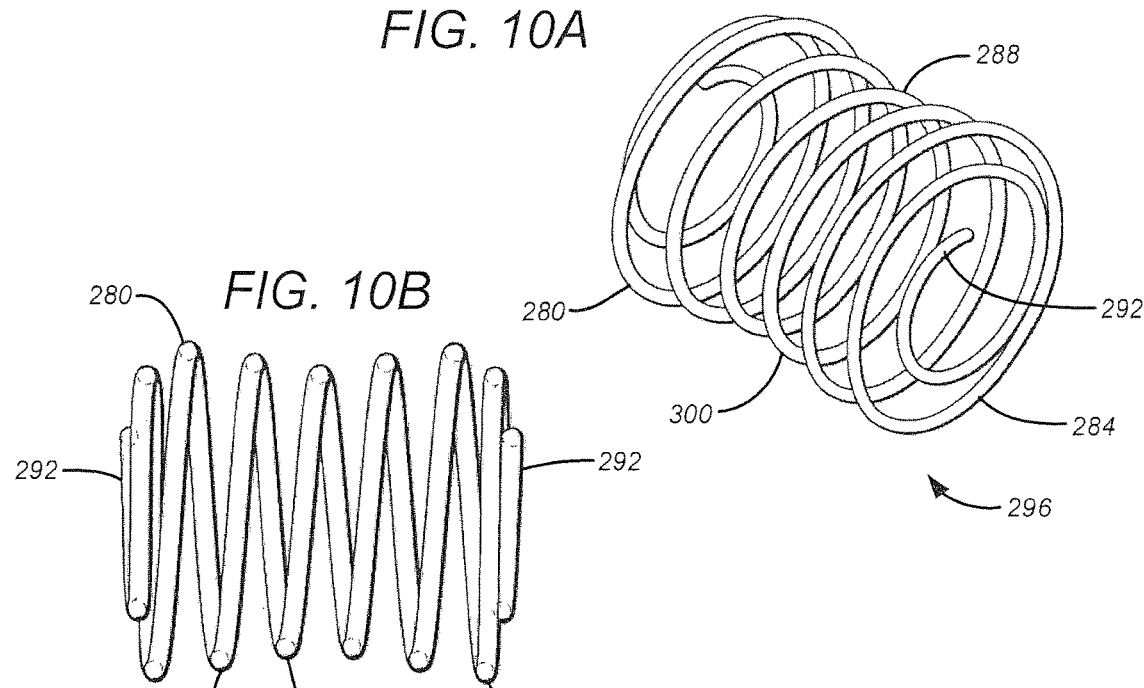
FIG. 10A
FIG. 10B
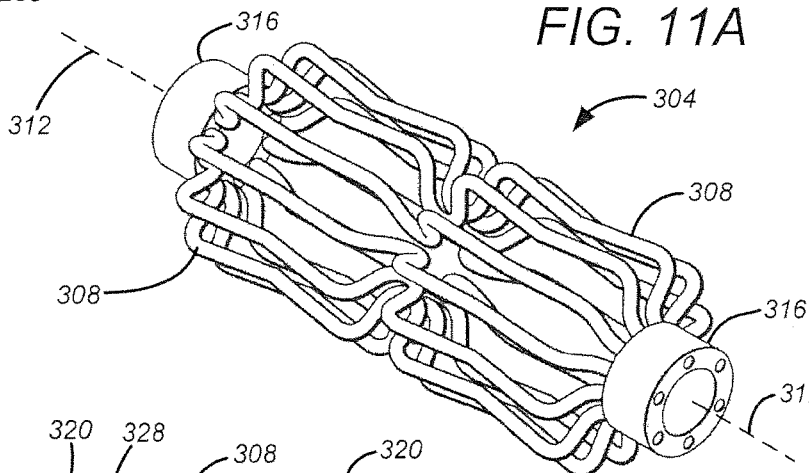
FIG. 11A
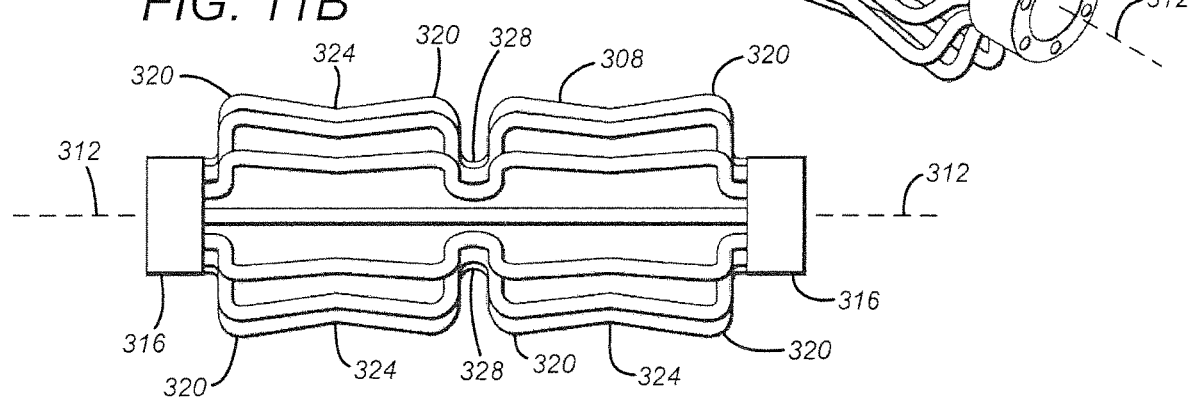
FIG. 11B

AUTOMATED FRUIT AND VEGETABLE CALYX OR STEM REMOVAL MACHINE

PRIORITY

This continuation application claims the benefit of, U.S. patent application Ser. No. 16/377,946 filed on Apr. 8, 2019, now U.S. Pat. No. 10,925,307, and U.S. Patent Application filed on May 11, 2016 and having application Ser. No. 15/152,400, now U.S. Pat. No. 10,285,429, and U.S. Patent Application, entitled "Automated Fruit and Vegetable Calyx or Stem Removal Machine," filed on Mar. 14, 2014, and having application Ser. No. 14/212,181, now U.S. Pat. No. 9,364,020 which claims the benefit of, and priority to, U.S. Provisional Application, entitled "Automated Fruit and Vegetable Calyx/Stem Removal Machine," filed on Mar. 15, 2013 and having application Ser. No. 61/790,303, the entirety of each of said applications being incorporated herein by reference.

FIELD

The field of the present disclosure generally relates to high-throughput food processing equipment. More particularly, the field of the present disclosure relates to a system and methods for removal of undesired portions of a fruit or vegetable, such as removal of the calyx from strawberries before they are flash frozen.

BACKGROUND

Second only to grapes, strawberries are among the largest non-citrus fruit specialty crop in the United States, with 2011 production values at $2,204,235,000 (USDA National Agricultural Statistics Service (NASS), 2012). Strawberry production involves repeated-fruit bearing and multiple harvests per season, making strawberries the highest tonnage per acre (25 tons/acre) crop among all fruits (USDA NASS 2012).

Strawberries are consumed fresh, as well as processed into many foods, such as ice cream, yogurt, juices, jams, jellies, baked goods, and the like. For strawberries harvested for the processing market, the calyx (the stem cap with green crown leaves) must be removed before freezing to prevent the final product from containing any inedible crown leaves or caps. Currently, field-harvesters use a hand-held cutting tool to remove the calyx. A drawback to this especially labor-intensive process is that it typically adds an additional 45-50% to the time required for fruit picking. In addition, strawberry growers face significant challenges in finding field workers willing to use the sharp hazardous instruments for harvesting. Another drawback to harvesting by way of hand-held cutting tools is that the tools generally are reused many times without sanitizing, which may serve as a vehicle for pathogen contamination.

What is needed, therefore, is a calyx removal system that may be operated in a processing plant rather than being performed by fieldworkers. Operating calyx removal systems in processing plants would significantly reduce field labor time, improve overall management and logistics, and increase throughput and yield. The strawberry industry has expressed interest in the development of an automated calyx removal system.

SUMMARY

Embodiments include an automated machine capable of orienting the vast majority of strawberries, such as greater than 90%, identifying the calyx location and optimal cutting angle, and severing the calyx from the body using a high-pressure water jet stream.

A process for automated high-throughput fruit or vegetable calyx removal includes a material handling system, a vision system, and a cutting system. The material handling system is capable of lifting the fruits or vegetables out of water and transporting the fruit for vegetable through the automated process. The material handling system may also orient the fruit or vegetables along an axis of the fruit and/or align the fruits or vegetables in a desired pattern, orientation, and/or configuration. The vision system uses one or more multiple image angles to locate calyx position data and an optimal cutting angle for individual fruit. The multiple image angles may come from a stationary imager of rotating fruit or vegetables or multiple imagers at various angles and orientations. The cutting system uses data received from the vision system to automatically remove the calyx from the fruit or vegetables. The cutting system may be an automated water jet cutting system that uses pipe flexibility to actuate a nozzle of the water jet cutting system along a separation path determined by way of the calyx position data and optimal cutting angle.

To this end, in an exemplary embodiment, a computer controlled strawberry pre-processing system, comprising: a vision system for sequentially imaging strawberries, the vision system configured to detect the location of the calyx for removal; a calyx removal system for separating the calyx from the strawberry based on the detected location from the vision system.

In another exemplary embodiment, further comprising: a loading system including a water tank and conveyor system to remove strawberries from the water tank and transport the strawberries through the vision system and calyx removal system, the conveyor system configured to rotate the strawberries along at least a portion of the transportation through the vision system.

In another exemplary embodiment, where the loading system comprises a frame including a track having an inclined section and a generally horizontal section, and a plurality of rods positioned along the track, the rods laterally movable from one end of the track to an opposing end of the track to laterally transport the strawberries through the pre-processing system. In another exemplary embodiment, where the plurality of rods comprise a profiled outer perimeter configured to position and orient the strawberries in a desired pattern, at least a portion of the profiled outer perimeter includes a generally circumferential striated pattern along a longitudinal length of the profiled outer perimeter. In another exemplary embodiment, wherein the profiled outer perimeter comprises shaped rollers positioned along shafts of the rods. In another exemplary embodiment, wherein the rods comprise a frictional engagement surface that contacts a portion of the frame such that when the frictional engagement surface is in contact with the frame and the rod is translated along the frame the rods rotate and when the frictional engagement surface is not in contact with the frame and the rod is translated along the frame the rod does not rotate.

In another exemplary embodiment, wherein the vision system comprises at least one camera for capturing sequential images of the strawberries. In another exemplary embodiment, wherein the calyx removal system comprises a bladeless pressure water knife. In another exemplary embodiment, wherein the bladeless pressure water knife operates at a pressure from 25 kPSI to 35 kPSI. In another exemplary embodiment, wherein the bladeless pressure water knife comprises a water nozzle coupled to an actuator such that the bladeless pressure water knife is translated along a separation path to remove a calyx from a strawberry.

Still another exemplary embodiment, a method of removing calyx from strawberries in a processing line, comprising: conveying a series of strawberries through the processing line; detecting the calyx of the series of strawberries with one or more sensors; cutting the calyx from the series of strawberries with a removal system.

In another exemplary embodiment, further comprising automatically orienting the series of strawberries and aligning the series of strawberries in a desired pattern for processing. In another exemplary embodiment, wherein the one or more sensors comprises a camera that takes sequential images of the strawberries. In another exemplary embodiment, further comprising processing the sequential images of the strawberries to automatically detect the calyx of the strawberry. In another exemplary embodiment, wherein the strawberries are rotated during the taking of sequential images to image various perspectives of the strawberries. In another exemplary embodiment, wherein the strawberries are translated but not rotated when traversing the removal system for cutting the calyx from the strawberries.

In another exemplary embodiment, wherein the removal system comprises a bladeless water pressure knife. In another exemplary embodiment, further comprising calculating a separation path to traverse with the bladeless water pressure knife to separate the calyx from the series of strawberries. In another exemplary embodiment, wherein the removal system is computer controlled to automatically move the bladeless water pressure knife to the necessary location for separating the calyx from the strawberries.

Still another exemplary embodiment, a process for automated high-throughput fruit calyx removal, comprising: a material handling system capable of lifting the fruit out of water, orient the fruit along an axis of the fruit; a vision system that uses one or more image angles to locate calyx position data and optimal cutting angle for individual fruit; and an automated water jet cutting system that uses pipe flexibility to actuate a nozzle of the water jet cutting system along a separation path determined from the calyx position data and optimal cutting angle.

In an exemplary embodiment, a produce portion removal system for removing calyxes from a multiplicity of strawberries comprises a loading system configured to store strawberries retrieved from fields; a conveyor system configured to transport the strawberries from the loading system and to arrange and orient the strawberries for calyx removal; a calyx identification system configured to locate the calyxes and determine separation paths between the calyxes and the strawberries; and a calyx removal system configured to separate the calyxes from the strawberries according to the separation paths determined by the calyx identification system.

In another exemplary embodiment, the conveyor system is comprised of a plurality of roller rods that are configured to lift the strawberries from a water storage tank comprising the loading system, the plurality of roller rods being disposed in a parallel arrangement so as to create spaces between adjacent of the plurality of roller rods suitable for receiving the strawberries. In another exemplary embodiment, each of the plurality of roller rods is comprised of a plurality of shaped rollers that are axially mounted onto a central shaft, each of the plurality of shaped rollers being configured to rotate with the central shaft and being profiled so as to operate with the asymmetric shapes of the strawberries to arrange and orient the strawberries for calyx removal. In another exemplary embodiment, each of the plurality of shaped rollers comprises a curvature and a multiplicity of openings to an interior space of the shaped roller configured to allow air and water to flow relatively freely through the interior space so as to minimize vertical splash-back of water during waterjet cutting of the strawberries, such that the strawberries remain stabilized on the shaped rollers during cutting while neighboring strawberries remain relatively unaffected. In another exemplary embodiment, the interior space is configured to facilitate detecting leftover strawberry debris and allow for cleaning of the shaped rollers by way of high pressure water bars or additional spot sanitation.

In another exemplary embodiment, the shaped rollers are configured such that a strawberry is oriented between the shaped rollers on adjacent roller rods and separated between adjacent shaped rollers on the same rod. In another exemplary embodiment, the shaped roller comprises a plurality of cut-out portions configured for passage of at least strawberry debris, juice, and water. In another exemplary embodiment, the shaped roller comprises an exterior diameter that tapers from a first end to a second end such that an outer diameter at the first end is larger than the outer diameter of the second end, a minimum outer diameter being disposed between the first and second ends, the minimum outer diameter being closer to the second end. In another exemplary embodiment, the shaped roller comprises a minimal outer diameter disposed substantially in the center of the shaped roller, such that the outer diameters of a first end and a second end are greater than the minimal outer diameter, the outer diameters of the first and second ends being approximately equal. In another exemplary embodiment, the shaped roller comprises an outer diameter that is substantially uniform along the length of the shaped roller.

In another exemplary embodiment, each of the plurality of shaped rollers is a spring roller comprised of a helically coiled wire configured to exhibit a contoured outer profile, the helically coiled wire comprising turns that are separated to create a striated pattern along a longitudinal length of the spring roller, and the turns comprising a pitch configured to exert a twisting force on the strawberries so as to arrange and orient the strawberries on the conveyor system. In another exemplary embodiment, the pitch is configured to allow passage of at least strawberry debris, juice, and water through an interior space of the shaped roller. In another exemplary embodiment, the contoured outer profile comprises an exterior diameter that is greater within a first end region and a second end region than a diameter within a central portion of the contoured outer profile. In another exemplary embodiment, terminal ends of the spring roller are configured with reduced diameters, such that the terminal ends may be coupled with the roller rod. In another exemplary embodiment, the spring roller is comprised of any suitable material and surface finish that minimizes bruising of strawberries being arranged and oriented on the conveyor system. In another exemplary embodiment, the spring roller is configured to be desirably stretched or compressed during assembly onto the central shaft so as to adapt the roller rod to different shapes and sizes of strawberries. In another exemplary embodiment, the spring roller is configured to be desirably stretched or compressed so as to allow any of various attachments to be inserted between adjacent spring rollers disposed on the central shaft, the various attachments being configured to assist with orienting the strawberries.

In another exemplary embodiment, each of the plurality of shaped rollers is a wire frame roller comprised of multiple wires that are disposed circumferentially around an axis of the roller and orientated longitudinally along the axis so as to form an outer profile of the wire frame roller, the multiple wires being oriented perpendicular to a desired rotational and translational direction of travel during use of the wire frame roller with the roller rod. In another exemplary embodiment, the wire frame roller comprises a hub disposed at each terminal end and configured to receive the multiple wires, the hubs being generally cylindrical collars that are sized to fit onto the roller rod and maintain the wire frame roller in a desired position thereon, the multiple wires being disposed circumferentially and fixedly retained within the hubs. In another exemplary embodiment, the multiple wires are configured to provide at least one decreased diameter section along a length of the wire frame roller, the decreased diameter being configured to at least arrange and orient the strawberries.

BRIEF DESCRIPTION OF THE DRAWINGS

The drawings refer to embodiments of the present disclosure in which:

FIG. 4A illustrates a front plan view of an exemplary embodiment of a conveyor roller rod that may be used to orient and hold produce according to the present disclosure;

FIG. 4B illustrates an isometric view of the conveyor roller rod of FIG. 4A, according to the present disclosure;

FIG. 5A illustrates a front plan view of an exemplary embodiment of a shaped profile rod configured to correspond to the generally cone-shaped profile of a strawberry, according to the present disclosure;

FIG. 5B illustrates a top plan view of adjacent shaped profile rods, as illustrated in FIG. 5A, according to the present disclosure;

FIG. 6A illustrates an isometric view of an exemplary embodiment of a roller according to embodiments of the invention;

FIG. 6B illustrates a side plan view of the exemplary embodiment of the roller illustrated in FIG. 6A in accordance with the present disclosure;

FIG. 7A illustrates an isometric view of an exemplary embodiment of a roller according to embodiments of the invention;

FIG. 7B illustrates a side plan view of the exemplary embodiment of the roller illustrated in FIG. 7A in accordance with the present disclosure;

FIG. 10A illustrates an isometric view of an exemplary embodiment of a spring roller in accordance with embodiments of the present disclosure;

FIG. 10B illustrates a side plan view of the exemplary embodiment of the spring roller illustrated in FIG. 10A, according to embodiments of the present disclosure;

FIG. 11A illustrates an isometric view an exemplary embodiment of a wire frame roller according to embodiments of the present disclosure;

FIG. 11B illustrates a side plan view of the exemplary embodiment of the wire frame roller illustrated in FIG. 11A in accordance with embodiments of the present disclosure;

Figure 1A:
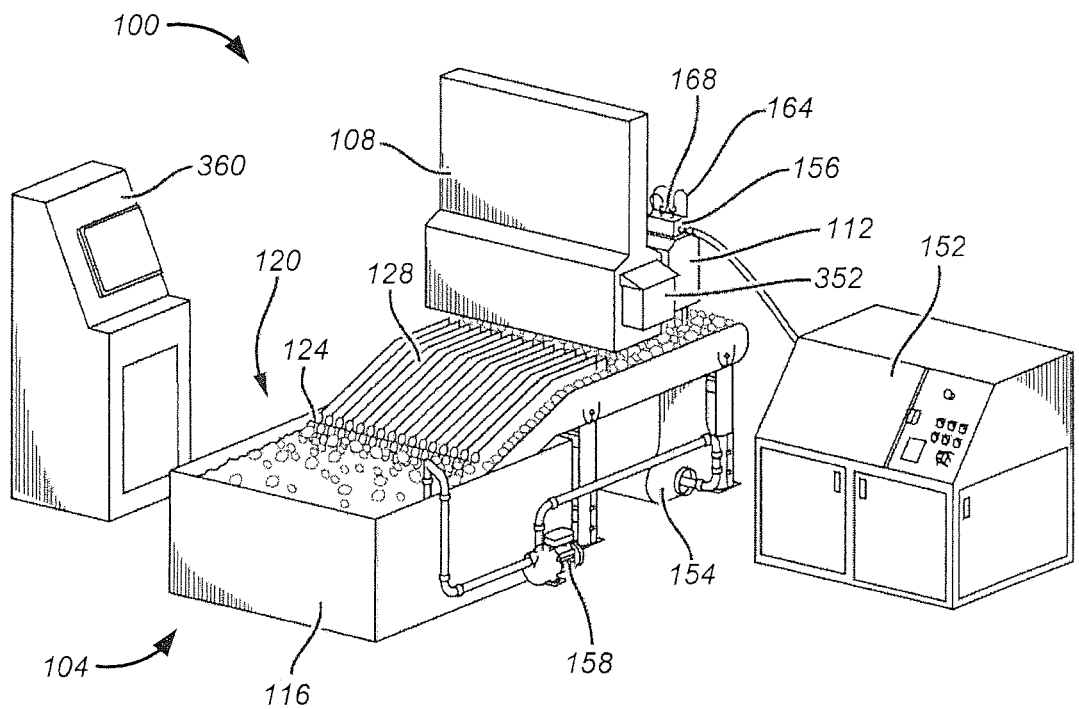
FIG. 1A illustrates a perspective view of an exemplary embodiment of a produce portion removal system, according to the present disclosure.

While the present disclosure is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the present disclosure.

DETAILED DESCRIPTION

In the following description, numerous specific details are set forth in order to provide a thorough understanding of the present disclosure. It will be apparent, however, to one of ordinary skill in the art that the invention disclosed herein may be practiced without these specific details. In other instances, specific numeric references such as "first roller," may be made. However, the specific numeric reference should not be interpreted as a literal sequential order but rather interpreted that the "first roller" is different than a "second roller." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

During use of a produce calyx removal system, as described herein, a worker may take a pallet of strawberries and place the strawberries in a water tank of the calyx removal system. The calyx removal system then automatically lifts the strawberries from the water tank and removes the calyxes to a separate bin. As such, the calyx removal system begins with a loading system for fruit to prepare the fruit for processing. An inclined-to-horizontal type conveyor lifts the strawberries from the water tank. In an exemplary embodiment, the conveyor comprises holders, such as shaped rods or shafts, rollers, coiled rollers, or a shaped bed with an exterior profile configured to encourage strawberries to naturally migrate into valleys of adjacent rods, rollers, or shaped bed. The rotation of the rollers causes the strawberries, or any suitably conical or asymmetrically shaped produce, to advantageously align between the rollers. The loading system may transport the strawberries from the water tank and through the calyx removal system. Further, the loading system may also locate and/or orient the strawberries in a desired alignment, orientation, position, elevation, and the like, as described herein.

When the fruit in transport by the loading system enters a calyx identification system of the produce calyx removal system, an industrial imaging camera may capture continuous images of the fruit surface and identify each calyx location. Once the strawberries exit the calyx identification system, multiple views of all calyxes will have been imaged and all calyxes will have been identified and precisely located. Upon exiting the calyx identification system, the rolling action is no longer necessary, and thus all the strawberries are left in a nonrotating state as they are conveyed to the calyx removal system. A conveyor shaft encoder may precisely track produce location during travel. A computer may register a precise position of each calyx in terms of coordinates that are synchronized with the motion of the conveyor. While there are several calyx removal mechanisms, an exemplary embodiment incorporates a non-metal or blade-free removal machine that receives the coordinates of each calyx from the computer and then removes the calyx in a precision cut, with a motion similar to a plotter. The severed calyxes fall downward through gaps between adjacent conveyor rollers and are carried away to a collection bin.

Although embodiments of the of the present disclosure may be described and illustrated herein in terms of removing the calyx from a strawberry, it should be understood that the embodiments disclosed herein are not so limited, but are additionally applicable to removing any identifiable feature from an object that may be oriented by rolling, such as any conical or asymmetrically shaped object. For example, other fruit, vegetable or foods may benefit from embodiments described herein, such as apples, tomatoes, carrots, berries, and the like. Furthermore, although embodiments of the present disclosure may be described and illustrated herein in terms of identifying a desired removable feature by continuously imaging, other analog or digital identification means may be used based on the desired identifiable feature. For example, infrared, magnetic, ultrasonic, electromagnetic, visual, optical, sonic, as well as sensing methods may be used to identify the location of the portion to be removed. In addition, although embodiments described herein utilize a blade-free or non-metal removal system to remove desired removable features, other removal mechanisms may be used, without limitation, such as cutting and/or blades, lasers, and the like.

FIG. 1A illustrates a perspective view of an exemplary embodiment of a produce portion removal system, in accordance with the present disclosure. The produce portion removal system 100 comprises a loading system 104, a calyx identification system 108, and a calyx removal system 112. The calyx identification system 108 preferably identifies and locates the calyx of each strawberry by way of one or more sensors, such as instantaneous imaging and optics, as described herein. Thus, the calyx identification system 108 is generally configured to detect all calyxes on either a moving or stationary conveyor so as to provide strawberry and calyx parameters regardless of their positions, orientations, sizes, and speeds. Embodiments as described herein may be located and/or retrofitted at a beginning of conventional processing lines. For example, in one embodiment, the system 100 may run a throughput of substantially 120 strawberries per second with sharp fine cuts at a desired location with substantially 1/16-inch precision to ensure a desired yield.

Figure 1B:
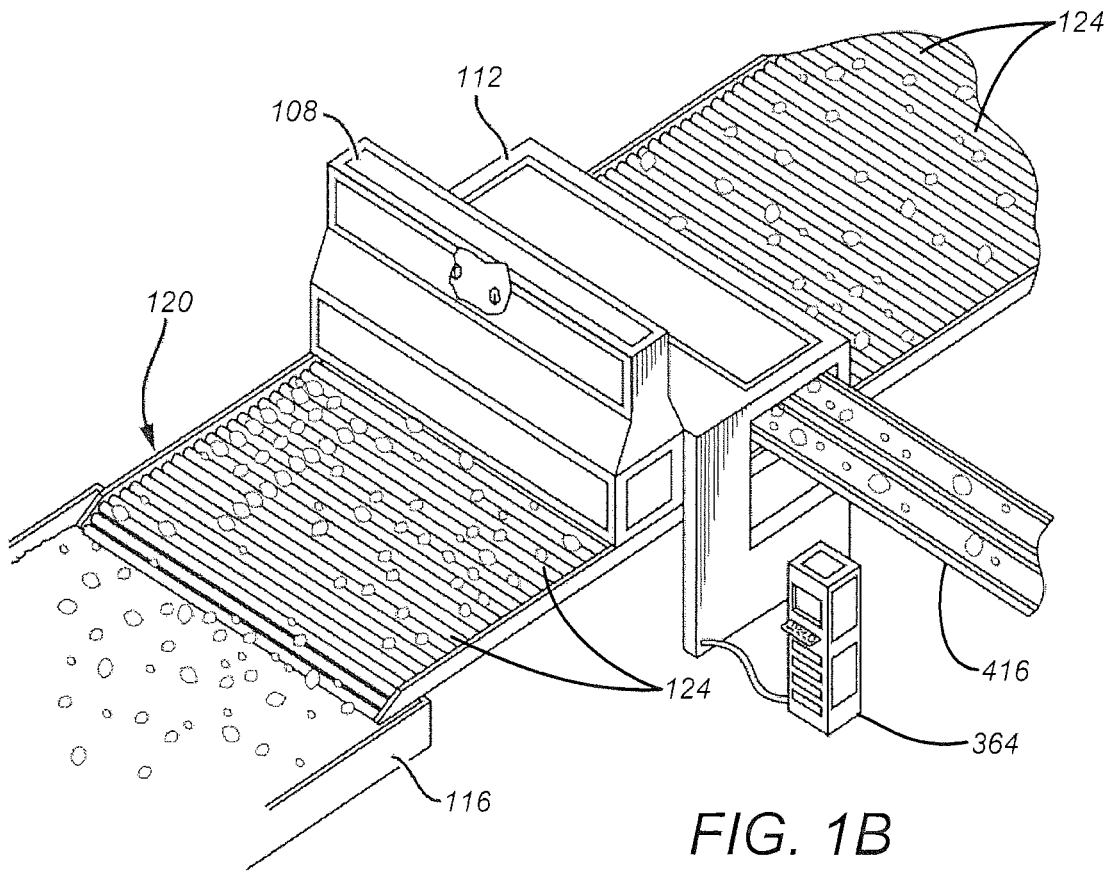
FIG. 1B illustrates an isometric view of an exemplary embodiment of a produce portion removal system according to the present disclosure.

The loading system 104 may include a water storage tank 116 for receiving strawberries retrieved from the fields, which include the calyx for removal. A conveyor system 120 may be used to transport the strawberries from the water storage tank 116 and through the system 100 including the calyx identification system 108 and the calyx removal system 112. As best shown in FIG. 1B, strawberries floating in the water storage tank 116 may be lifted from the water by valleys between adjacent roller rods 124 of the conveyor system 120 and carried through the produce portion removal system 100. The loading system 104 may be configured to separate and orient the strawberries into a desired arrangement, such as aligned in rows and/or aligned in orientation before entering the calyx identification and removal systems 108, 112. For example, the loading system 104 may separate strawberries generally into rows, such that single sequential strawberries are fed into the calyx identification and removal systems 108, 112 for any cross-sectional position of the conveyor system 120. Thus, as best shown in FIG. 1B, a plurality of rows may be arranged across the width of the conveyor system 120 such that several strawberries may enter the systems 108, 112 concurrently through multiple rows. The rows may be physically separated by one or more barriers, such as a multiplicity of dividing fins 128. Alternatively, the loading system 104 may be configured to position the strawberries to create rows without physical barriers.

Figure 2:
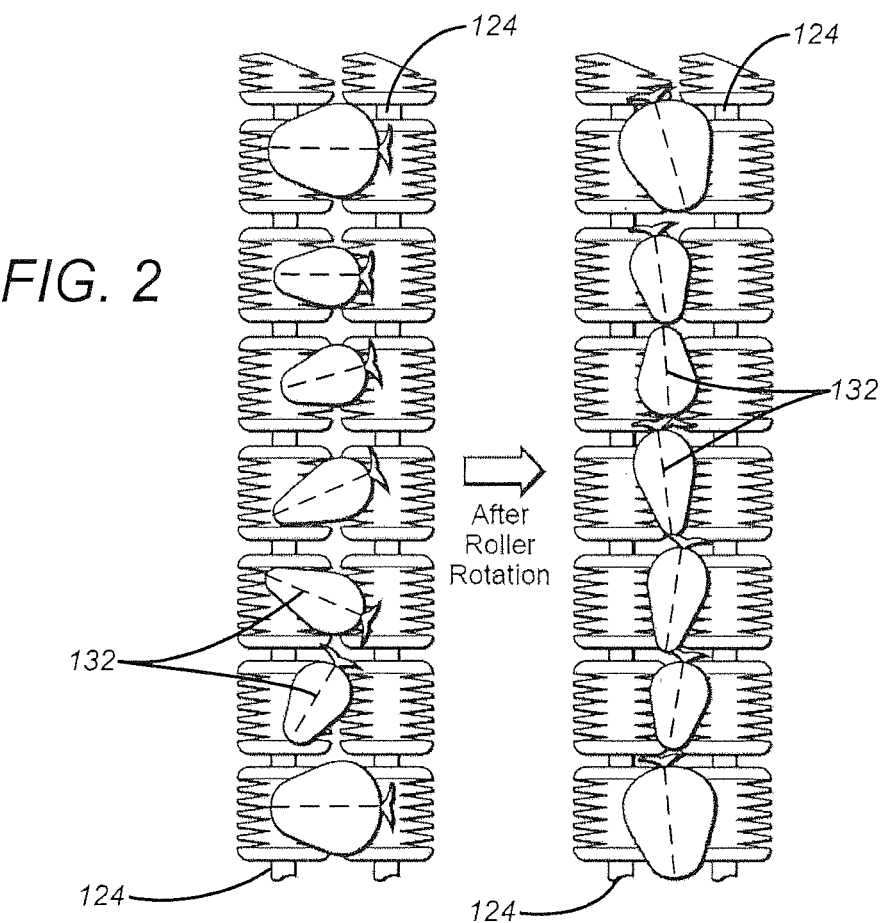
FIG. 2 illustrates an exemplary product reorientation according to the present disclosure.

The loading system 104 may be configured to orient the strawberries in any desired arrangement relative to the conveyor system 120 and/or adjacent strawberries. For example, as shown in FIG. 2, a longitudinal line 132 of the strawberry extending from the calyx to an opposing end of the strawberry may be oriented relative to adjacent strawberries. Upon entering the loading system 104, the longitudinal lines 132 of the strawberries may be arranged in a variety of random orientations relative to one another immediately following loading or removal from the water storage tank 116. After being carried along by the roller rods 124 of the conveyor system 120, the longitudinal lines 132 of the strawberries assume a substantially parallel arrangement relative to adjacent strawberries and the rods 124. Thus, in the illustrated embodiment of FIG. 2, the calyx may be oriented toward either one of two opposing sides of the conveyor system 120 as the strawberry enters the calyx identification and removal systems 108, 112. As will be recognized, positioning the strawberries in a sideways position enables the waterjet of the exemplary removal system to more easily remove the calyx from the strawberry by way of the forward motion of the conveyor system 120.

As stated above, however, the loading system 104 may be used to orient and position the strawberries in any desired arrangement. In some embodiments, therefore, the calyxes may be positioned facing toward or away from the calyx removal system 112 (or in line with the direction of the conveyor system 120), facing toward either of opposing sides of the conveyor system 120 as disclosed above with respect to FIG. 2, facing toward a top or bottom of the conveyor system 120, or any orientation or combination of orientations in between, such that the calyx identification and removal systems 108, 112 have a context for presuming a starting orientation of the incoming strawberries. Therefore, the loading system 104 may be configured to convey the strawberries from a random orientation upon loading or removal from the water storage tank 116 and reorient them into a desired uniform orientation, alignment, position, for further processing by the calyx identification and removal systems 108, 112. In one embodiment, the loading and conveyor systems 104, 120 are configured to run a throughput of approximately 120 strawberries per second, or substantially 12,000 pounds per hour, so as to accommodate strawberry production during peak season, around June.

Figure 3:
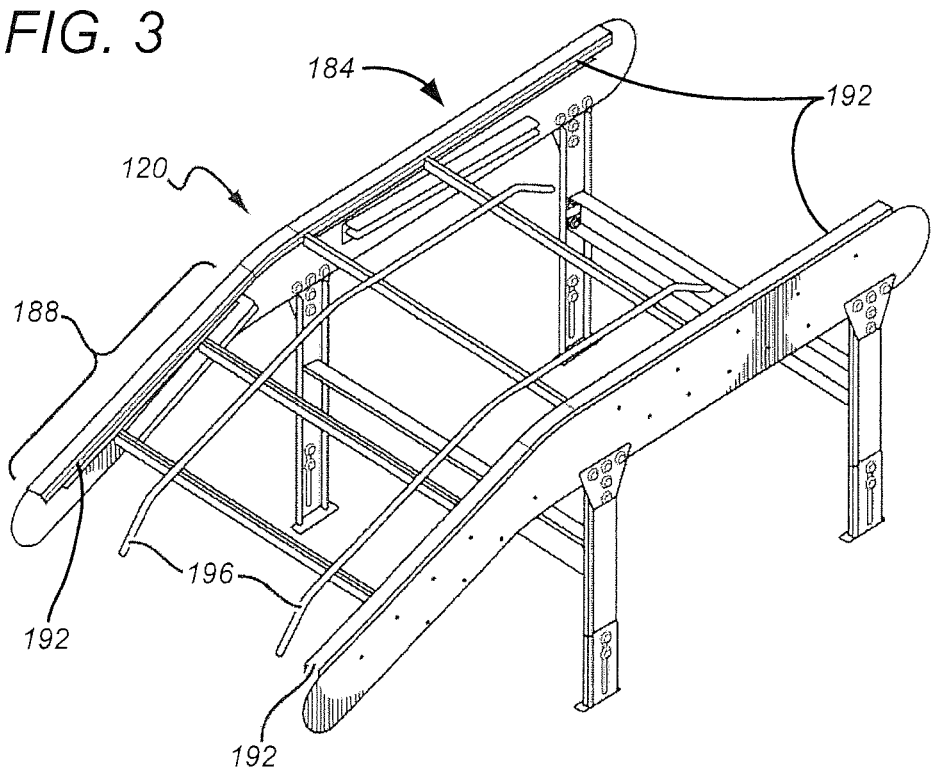
FIG. 3 illustrates an isometric view of an exemplary embodiment of a conveyor frame according to the present disclosure.

FIG. 3 illustrates an isometric view of an exemplary embodiment a conveyor frame comprising the conveyor system 120 according to the present disclosure. The conveyor system 120 preferably automatically arranges the strawberries, such that adjacent strawberries are oriented generally parallel. As shown in FIG. 3, the conveyor system 120 comprises a horizontal section 184 and an elevating section 188 configured to be positioned within the water storage tank 116, as shown in FIGS. 1A and 1B. In some embodiments, the elevating section 188 may be positioned within conventional water tanks already in use in strawberry processing plants. The elevating system 188 may be configured to place strawberries floating in the water tank 116 in contact with the conveyor system 120, such that the strawberries may be lifted from the water and transported to the calyx identification system 108 by way of the horizontal section 184.

The conveyor system 120 may comprise any moving system, but as shown and described herein, the conveyor system comprises a plurality of parallel roller rods 124. As such, the conveyor system 120 comprises outer tracks 192 that are configured to engage and/or support terminal ends of the roller rods 124, as best shown in FIG. 1B. The conveyor system 120 further comprises one or more internal tracks 196 that are configured to contact rolling points 200 of the roller rods 124, shown in FIGS. 4A and 4B. As will be appreciated, friction arising between the internal tracks 196 and the contact rolling points 200 causes rotation of the entire roller rod 124.

The rolling rod 124 generally comprises a plurality of shaped rollers 204 that are axially mounted onto a central shaft 208, as shown in FIGS. 4A-4B. The shaped rollers 204 are configured to rotate with the central shaft 208 and are profiled so as to use the asymmetric shape of the strawberries to arrange the strawberries into a desired configuration, as discussed with respect to FIG. 2. Further, a separation may be disposed between adjacent shaped rollers 204 so as to encourage the strawberries to form lines, or rows, parallel to the direction of translation of the conveyor system 120. In some embodiments, the shaped rollers 204 and/or profile of the roller rod 124 may be configured to accommodate an average or common shape of a strawberry so that the strawberries become advantageously separated from one another and oriented as discussed above with respect to FIG. 2. As will be recognized, encouraging a separation or desired spacing between the strawberries, such that the strawberries become aligned and oriented, facilitates a far more efficient identification and removal of each calyx. In the embodiment illustrated in FIGS. 4A-4B, the roller rod 124 includes a conveyor shaft encoder 212 configured to interact with the outer tracks 192 such that the position of the roller rod 124 along the conveyor system 120 may be tracked.

In some embodiments, the roller rod 124 may be comprised of a solid rod configured to arrange and orient the strawberries, as disclosed herein. FIG. 5A illustrates a front plan view of an exemplary embodiment of a shaped profile rod 216 comprising a curved saw-tooth shape configured to correspond to the generally cone shaped profile of a strawberry. As best shown in FIG. 5B, the curved saw-tooth shape forms a plurality of strawberry-shaped valleys 220 between adjacent profile rods 216. The outer profile of each shaped profile rod 216 begins at a maximal outer diameter 224 near one end of the rod and then generally tapers nearly linearly or at a slight curve to a minimal diameter 228 of the rod. The minimal diameter 228 may be maintained or nearly maintained for a short length along the rod, or slightly increase, before rapidly increasing to the maximal diameter 224. The outer profile of the rod 216 then repeats the curved saw-tooth shape along the length of the rod.

As disclosed herein, the strawberries sit in valleys between the outer profile of the rollers and/or shaped rods to position and orient the strawberries for processing. The rotation of the roller rods 124 along the conveyor system 120 causes the strawberries to rotate and become oriented within the valleys between the outer profile of adjacent roller rods. After the strawberries leave the calyx identification system 108, the internal tracks 196 may terminate or ramp downward (as shown in FIG. 3) away from the contact rolling points 200 such that rotation of the rods 124 ceases. Without the frictional engagement between the rolling points 200 and the tracks 196, the roller rods 124 no longer rotate and the relative position of the strawberries may be maintained and translationally tracked by way of the conveyor shaft encoder 212.

FIGS. 6A-11B illustrate exemplary embodiments of rollers configured for orienting the strawberries such that the longitudinal lines 132 of the strawberries are arranged substantially parallel with one another and with the axis of the roller rods 124, as shown in FIG. 2. The rollers may be configured such that a strawberry is oriented between the rollers on adjacent roller rods and separated between adjacent rollers on the same rod. Alternatively, two adjacent rollers on the same rod may cooperate to orient a strawberry. Thus, generally 2 or 4 rollers may be used to orient the strawberry on two adjacent roller rods 124. The outer profiles may vary between the exemplary rollers. The exemplary rollers may be made of metal, plastics, metal wire, and the like. The construction shape may be made from solid rods, cylindrical tubes, disks of varying radii, metal rings, wrapped or coiled wires, or shaped meshes that form the outer profile of the roller.

In general, the rollers provide an outer profile shape for orienting the strawberries, as described. The rollers may also include a striated pattern such as through cuts, slits, or openings generally circumferentially disposed around the roller and positioned along the longitudinal length of the roller. The striated pattern creates peaks along the roller that form an outer-most profile to orient and position the strawberries, while the valleys provide a water path for the calyx removal system 112 to reduce spray and splash-back. The striated pattern is configured to minimize splash-back during the waterjet separation of the calyxes from the strawberries. The striated pattern also decreases the amount of rotational movement of the rollers when passing under the waterjet cutting stream. The striated pattern also provides a path to the discharge conveyor for any undesirable material to pass from the roller and out of the system.

FIG. 6A illustrates an isometric view and FIG. 6B illustrates a side plan view of an exemplary embodiment of a tapered roller 232 according to the present disclosure. The tapered roller 232 comprises an exterior diameter that generally tapers from a first end 236 to a second end 240 such that an outer diameter at the first end 236 is larger than the outer diameter of the second end 240. In some embodiments, the outer profile along the tapered roller 232 from the first end 236 to the second end 240 may be linear or curved. In the embodiment of FIGS. 6A-6B, the minimum outer diameter occurs between the first and second ends 236, 240, and is closer to the second end 240. As shown, the minimum outer diameter may be disposed at approximately one-third to one-fourth the length of the tapered roller 232 from the second end 240. As best shown in FIG. 6B, the tapered roller 232 comprises a plurality of cut-out portions that form local valleys 238 suitable for passage of debris, juice, water, and the like.

FIG. 7A illustrates an isometric view and FIG. 7B illustrates a side plan view of an exemplary embodiment of a narrowed roller 244 in accordance with the present disclosure. The narrowed roller 244 of FIGS. 7A-7B is similar to roller 232 of FIGS. 6A-6B in which the outer profile of the roller 244 is contoured from a first end 248 of the roller to a second end 252. However, the minimum outer diameter of the narrowed roller 244 is disposed substantially in the center of the roller, such that the outer diameters of the first and second ends 248, 252 are approximately equal and greater than the outer diameter of the center of the roller. As shown in FIGS. 7A-7B, therefore, the outer profile of the narrowed roller 244 is generally symmetric. Further, the narrowed roller 244 comprises cut-out portion that form local valleys 250 configured to allow passage of debris, juice, water, and the like.

Figure 8A:
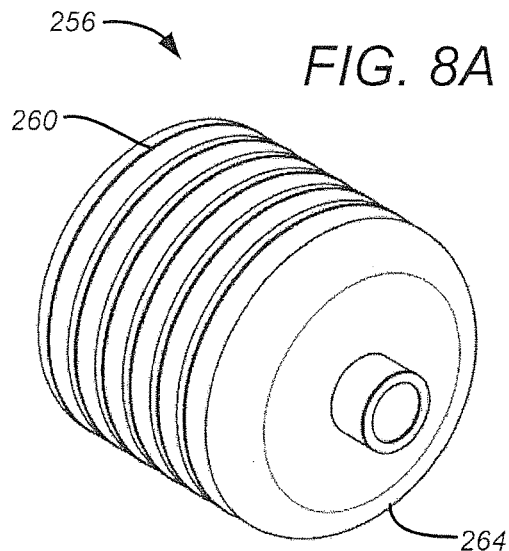
FIG. 8A illustrates an isometric view of an exemplary embodiment of a roller according to embodiments of the invention.
Figure 8B:
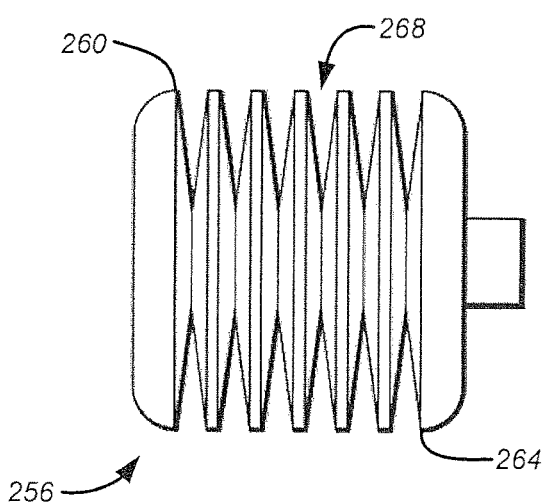
FIG. 8B illustrates a side plan view of the exemplary embodiment of the roller illustrated in FIG. 8A in accordance with the present disclosure.

FIG. 8A illustrates an isometric view and FIG. 8B illustrates a side plan view of an exemplary embodiment of a symmetric roller 256 according to the present disclosure. The symmetric roller 256 is similar to the rollers 232 and 244, respectively illustrated in FIGS. 6A-6B and FIGS. 7A-7B, with the exception that the symmetric roller 256 comprises an outer diameter that is substantially uniform along the length of the roller, extending from a first end 260 to a second end 264. As will be recognized, therefore, the symmetric roller 256 of FIGS. 8A-8B is generally cylindrical with cut-out portions creating local valleys 268 configured for passage of debris, juice, and water.

Figure 9A:
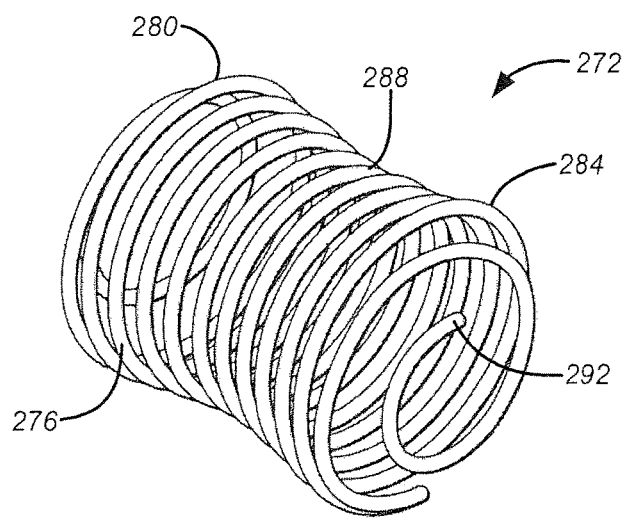
FIG. 9A illustrates an isometric view of an exemplary embodiment of a spring roller according to embodiments of the present disclosure.
Figure 9B:
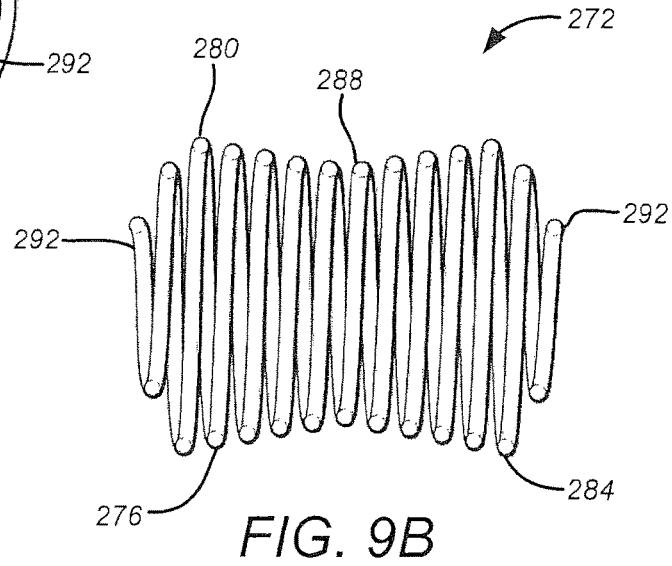
FIG. 9B illustrates a side plan view of the exemplary embodiment of the spring roller illustrated in FIG. 9A, according to the present disclosure.

FIG. 9A illustrates an isometric view and FIG. 9B illustrates a side plan view of an exemplary embodiment of a spring roller 272 configured in accordance with the present disclosure. The spring roller 272 is generally comprised of a helically coiled wire 276 configured to exhibit a contoured outer profile. The turns of the helically coiled wire 276 are separated to create a striated pattern along a longitudinal length of the roller 272. The outer profile of the spring roller 272 comprises an exterior diameter that is greater within a first end region 280 and a second end region 284 than the diameter within a central portion 288 of the outer profile. Terminal ends 292 of the spring roller 272 are configured with reduced diameters, such that the terminal ends 292 may be attached or contact the roller rod 124 to position the roller 272 at a desired location along the roller rod. The wire comprising the spring roller 272 may include a circular cross section, rectangular cross section, square cross section, or otherwise shaped to provide a desired contact surface to the strawberry, or may be a combination thereof. Further, the pitch or space between adjacent turns of the helically coiled wire 276 operates to exert a twisting force on strawberries that may be utilized for orientation purposes, as described herein.

FIG. 10A illustrates an isometric view and FIG. 10B illustrates a side plan view of an exemplary embodiment of a spring roller 296 in accordance with the present disclosure. The spring roller 296 illustrated in FIGS. 10A-10B is similar to the spring roller 272 of FIGS. 9A-9B, with the exception that the spring roller 296 comprises a helical coiled wire 300 comprising a relatively greater pitch or space between adjacent turns of the coil. Thus, the separation between the turns of the helically coiled wire 300 creates a relatively greater volume of empty interior space within and along the longitudinal length of the roller 296. As will be appreciated, the empty interior space operates similarly to the plurality of local valleys, discussed with respect to FIGS. 6A-6B, and is configured to provide passage of debris, juice, water, and the like.

It should be understood that the spring rollers 272 and 296 may be comprised of any of various suitable materials and surface finishes that facilitate gentle grasping of strawberries so as to minimize bruising of the strawberries during arranging and oriented of the strawberries on the conveyor system 120. Further, it is envisioned that the spring rollers 272 and 296 may be economically fabricated to accommodate a wide range of fruit shapes, sizes, and physical attributes, without limitation. For example, in some embodiments, the spring rollers 272, 296 may be stretched or compressed during assembly onto the central shaft 208 so as to adapt the roller rod 124 to different shapes and sizes of strawberries. In some embodiments, the central shaft 208 may be threaded so as to receive the spring rollers 272 and 296. Further, the spring rollers 272, 296 may be stretched or compressed to allow any of various attachments to be inserted between the rollers disposed on the central shaft 208, so as to assist in strawberry orientation without damaging the rollers.

FIG. 11A illustrates an isometric view and FIG. 11B illustrates a side plan view of an exemplary embodiment of a wire frame roller 304 according to the present disclosure. Unlike the helically coiled wires of FIGS. 9A-9B, the wire frame roller 304 is comprised of multiple wires 308 that are orientated generally longitudinally along an axis 312 of the roller. The wires 308, therefore, are orientated generally perpendicular to a desired rotational and translational direction of travel during use with the roller rod 124. The wire frame roller 304 comprises a hub 316 disposed at each terminal end and configured to receive the wires 308 as well as maintain a desired separation distance between adjacent rollers. In the illustrated embodiment, the hubs 316 are comprised of generally cylindrical collars that are sized to fit onto the roller rod 124 and maintain the roller 304 in a desired position on the roller rod.

The terminal ends of the multiple wires 308 are disposed circumferentially within the collars so as to form an outer profile of the roller 304. The outer profile may be any desired configuration to orient an asymmetrically-shaped object, such as a strawberry, as disclosed herein. As shown in FIGS. 11A-11B, the outer profile of the wire frame roller 304 is comprised of two shaped sections that generally mirror each other across a perpendicular mirror plane at the center of the roller 304. For example, the first half of the longitudinal length of the roller 304 is substantially a mirror image of the second half of the longitudinal length of the roller across the mirror plane perpendicular to the longitudinal axis at the center of the roller. The multiple wires 308 originate from the hub 316 at each terminal end of the roller 304 and then extend outwardly to a maximal diameter 320. The wires 308 decrease and then increase again along the longitudinal length to create a valley 324 disposed generally centrally within the respective first and second halves, or at approximately ⅕ to ⅓ the length of the roller 304 from the respective terminal ends of the roller. The outer profile at the central portion of the roller 304 is comprised of a decreased diameter section 328, forming a separation between the first and second halves of the roller.

As will be recognized, wire-based rollers, such as the rollers illustrated in FIGS. 9A-11B, comprise a relatively greater volume of empty interior space than the striated rollers illustrated in FIGS. 6A-8B. The hollow interior space of wire-based rollers, in combination with the curvature of the rollers, advantageously allows air and water to flow relatively freely through the rollers, giving rise to a minimal degree of vertical splash-back of water during waterjet cutting of the strawberries. In absence of substantial water splash-back during waterjet cutting, the strawberries remain stabilized on the rollers during cutting while neighboring strawberries remain advantageously unaffected. Further, hollow interior space facilitates detecting leftover strawberry debris and allows for cleaning of the wire-based rollers by way of high pressure water bars or additional spot sanitation.

With reference again to FIGS. 1A and 1B, the calyx identification system 108 is configured to identify the position of each strawberry and/or calyx so as to determine where to make a separation of the calyx from the strawberry. The calyx identification system 108 may capture one or more images or scans of the strawberry as it passes there through. Although described in terms of images or scans, the detection, location, and orientation determination of the calyx identification system 108 is not to be limited to visual or spectral imaging. Rather, a range of systems may be used to determine the locations and/or orientations of strawberries. For example, one or more sensors, such as optical (visual, infrared, ultraviolet, etc.), sonic, tactile, pressure, and the like, may be positioned along or around one or more rows of incoming strawberries so as to determine the location of the calyx relative to the strawberry and calculate a separation position for the calyx removal system 112.

The calyx identification system 108 may be used in conjunction with the loading system 104 to determine the location and/or orientation of the strawberry features, such as the calyx. For example, if the loading system 104 orients and aligns the strawberries in an expected way, as described herein, then the calyx identification system 108 merely needs to identify specific parameters associated with assumptions permitted based on the loading system 104. Thus, if the loading system 104 orients the longitudinal lines 132 of an incoming row strawberries parallel to each other and perpendicular to the direction of the conveyor system 120 (i.e., perpendicular to the row of strawberries), then the calyx will be positioned at one of either opposing sides of the row. Consequently, the calyx identification system 108 merely scans from one end of the row until the presence of an object is detected. A terminal end of the object may be detected, inspected, and determined to contain the calyx or not. Once the calyx is determined to be located at the terminal end, the location relative to the side of the row may be determined, thus positioning the calyx relative to a coordinate system of the produce portion removal system 100. The calyx identification system 108 may then scan or image the end region adjacent to the calyx so as to determine an optimal separation location and/or trajectory. Alternatively, or in addition thereto, the calyx identification system 108 may fully scan or image the strawberry to determine the location, orientation, and/or separation location.

Figure 12:
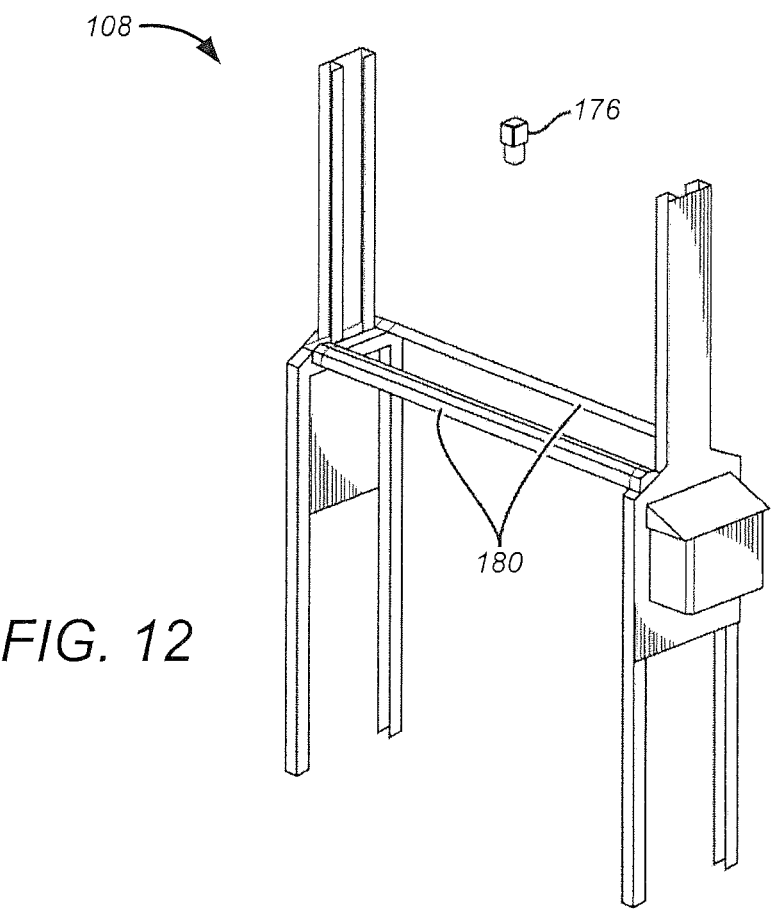
FIG. 12 illustrates an isometric view of an internal portion of an exemplary embodiment of a calyx identification system in accordance with the present disclosure.

FIG. 12 illustrates an isometric view of an internal portion of the calyx identification system 108 in accordance with the present disclosure. As disclosed herein, the calyx identification system 108 scans or images the strawberries to precisely identify the locations of the calyxes of strawberries carried along by the conveyor system 120. The strawberries may be tracked regardless of their positions on the conveyor enabling either random or individual strawberry handling by way of guided removal mechanisms of the calyx removal system 112. As shown in FIG. 12, a camera 176 and one or more lights 180 are fully enclosed within calyx identification system 108. In some embodiments, more than one camera 176 may be incorporated into the calyx identification system 108. Further, a translucent, low-glare polymer shield that has been treated with an anti-condensation film may be used to protect the light 180 and camera 176.

In an exemplary embodiment, the strawberries enter the calyx identification system 108 in a single layer, and one or more cameras 176 image the strawberries as they rotate on the conveyor system 120. The calyx identification system 108 may use single shot, sequential imaging, or a continuous video imaging of the passing strawberries. In an exemplary embodiment, the camera 176 may be comprised of an industrial color Charge-Coupled Device (CCD) camera and may be disposed in a stationary position above the conveyor system 120 so as to capture continuous images of strawberries within the field of view. As each strawberry exits the field of view, the strawberry's calyx location in coordinates may be recorded. Further, the conveyor system 120 may cease rotating the strawberries such that each strawberry's position is fixed relative to the conveyor system 120. In some embodiments, the calyx identification system 108 may also be configured to identify and detect defects within the surface of strawberries and/or diseased strawberries that may be rejected and separated from the rest of the processed strawberries.

The industrial color CCD camera 176 may obtain images of each strawberry and its calyx. The calyx may be extracted by using image features, such as color, relative location to fruit shape, and other combinations of spectral imaging and geometry. In some embodiments, infrared imaging may be used to identify the calyx and background removal in image processing, as desired. Further, the rotation of the strawberries may be used to identify the strawberry, the shape of the strawberry, and/or the calyx.

In one exemplary embodiment, the industrial color CCD camera 176 may be configured to record each image in 16:9 HD format, and a screen ratio may be configured to correspond to the width of the conveyor system 120. For example, the camera 176 may be used with a conveyor system 120 comprising a width of approximately 36 inches, containing approximately 10 parallel rows of strawberries. A viewing window of the camera 176 may contain up to 24 separated strawberries along each of the 10 parallel rows, or a total of substantially 240 strawberries. The industrial color CCD camera 176 may have a pixel resolution <0.5 mm (H)×0.5 mm (V)=0.25 mm$^2$/pixel for a 1,920×1,080 regular HD CCD imager. Higher resolutions or multiple cameras may be used, as desired. As will be appreciated, a rate of 10 First In First Out (FIFO) views/second requires approximately 20.8 megapixels/second.

The calyx removal system 112 may be comprised of any mechanism for removing the identified calyx from the strawberries, such as blade, laser, waterjet knife, non-blade systems, or other cutting or removal system. In the case of non-food processing using the same exemplary process for removing a portion of an asymmetrically shaped object, other cutting or removal systems may be used as well, such as sand or grit blasting. In an exemplary embodiment, the calyx removal system 112 may include a synchronized waterjet knife or non-blade removal waterjets with an optional fixed or motional configuration. In some embodiments, the calyx removal system 112 may be fixed, such that a number of removal mechanisms may be provided and selectively activated based on the identified position of the calyx for removal. Alternatively, the removal mechanism may be motional such that the orientation and/or location of the cutting device may be translated and/or angularly oriented. For example, the calyx removal system 112 may translate in two dimensions such that the cutting device may move to a desired longitudinal position of the strawberry so as to remove a desired terminal end of the strawberry.

Figure 13:
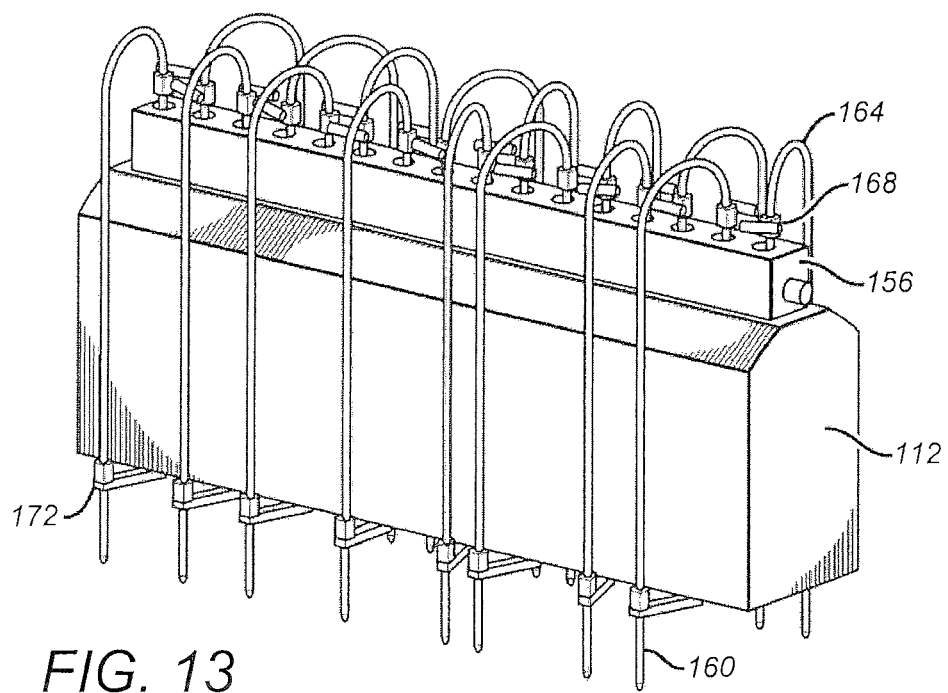
FIG. 13 illustrates an isometric view of an exemplary embodiment of a calyx removal system, according to the present disclosure.

FIG. 13 illustrates an isometric view of an exemplary embodiment of the calyx removal system 112, according to the present disclosure. The calyx removal system 112 may be any system configured to remove a portion of fruit identified by way of the calyx identification system 108. For example, the calyx removal system 112 may comprise a waterjet knife, impulse blade, non-blade, or non-metal cutters actuated by a vision-guided computer system. In an exemplary embodiment, the calyx removal system 112 may comprise an automated waterjet cutting system. The cutting system may include synchronized waterjet knives or a non-blade removal system with an optional fixed or motional configuration.

A plurality of nozzles comprising the non-blade removal system may be fixed or mobile depending on a desired cost of the system, accuracy of cut, or a desired maximization of retained fruit. Nozzle heads of the non-blade removal system may be fixed and permit local motion, such that the nozzles may be translated laterally across the conveyor system 120 to remove a terminal end of the fruit, but remain in a fixed orientation. The nozzle heads may similarly be maintained in a fixed lateral position, but permit local orientation so as to move the nozzle heads in a conical arc to make a desired separation. Alternatively, the nozzles may be fully mobile, such that they may be translated and locally oriented to position the nozzles in any three dimensional orientation and direction. Therefore, the nozzles may comprise no translation, one-dimensional translation, two-dimensional translation, three-dimensional translation, rotational orientation, and any combination thereof. As will be appreciated, the soft material comprising strawberries facilitates calyx removal using a relatively lower water pressure in the cutting system. In some embodiments, the nozzles may be configured to jet water at pressures ranging between approximately 3 kPSI and 50 kPSI, and preferably between 25 kPSI and 35 kPSI.

In the embodiment illustrated in FIG. 1A, a custom pressure pump 152 supplies high-pressure water to the calyx removal system 112. The custom pressure pump 152 uses a minimal volume of water relative to the average daily usage of a produce processing plant. In the illustrated embodiment, water may also be recycled from a water collecting tank 154 back into the water tank 116 by a simple external pump 158 for strawberry cleaning purposes.

As shown in FIG. 13, high-pressure water enters a manifold 156 and is passed to a plurality of nozzles 160 through flexible metal tubing 164. The flexible metal tubing 164 allows for inexpensive implementation of axis and angle actuation of the nozzles 160. Further, in the event that a nozzle 160 becomes damaged, the nozzle may be shut off by way of a water valve 168. A position of each of the plurality of nozzles 160 may be locally changed and/or oriented by way of an actuator 172. In some embodiments, the actuators 172 may be comprised of air cylinders, linear actuators, or rotary actuators. Thus, the actuators 172 may be used to arrange the nozzles 160 on opposing sides of the calyx removal system 112 such that one nozzle services each row of strawberries traveling on the conveyor system 120. Each of the plurality of nozzles 160 may be locally dynamically adjusted by way of the actuators 172 so as to precisely separate the calyxes from the strawberries passing on the conveyor. In some embodiments, the calyx removal system 112 may communicate with the calyx identification system 108 to obtain the locations of the separation paths with respect to the width of the conveyor system 120. The actuator 172 may translate the nozzles 160 across the conveyor system 120 to the desired separation position of each row of strawberries.

As will be appreciated, using a single nozzle 160 to process each row of strawberries requires a minimal degree of motion control, and thus advantageously provides simple, fast, clean, sharp cuts safely without using metal blades. However, deploying numerous nozzles 160 generally increases system cost. In the exemplary embodiment of FIG. 13, the plurality of nozzles 160 each may comprise an orifice of substantially 1/5000 inch (to create a "fish line" cut) and operate at a water pressure of substantially 50 kPSI, thus using approximately 3 gallons/min of water. In some embodiments, therefore, the custom pressure pump 152 may comprise a single 150-hp pump or three 50-hp pumps. In one embodiment, the calyx removal system 112 has a throughput of approximately 120 strawberries per second, or substantially 432,000 strawberries per hour.

In some embodiments, relatively few of the plurality of nozzles 160 may be used to de-calyx strawberries. For example, in some embodiments, a single nozzle 160 may be used to remove calyxes of more than one row of strawberries. Thus, the translation of any given nozzle 160 by the corresponding actuator 172 may be increased. It is envisioned that each of the nozzles 160 may translate similarly to print-heads of a plotter. In an exemplary embodiment, each of six nozzles 160 may sweep across 4 to 6 rows so as to accommodate a conveyor system 120 comprising approximately 24 to 36 parallel rows of strawberries. The nozzles 160 may impulse at approximately 20 ms or less, such as, for example, by way of an air cylinder control valve. Thus, a calyx removal system 112 comprising six nozzles 160 may remove the calyx from 24 parallel rows of strawberries such that 144 strawberries may be processed per second. As will be appreciated, such embodiments greatly reduce the cost of the plurality of nozzles 160, the volume of water used per minute, and requirements relating to the custom pressure pump 152.

Figure 14A:
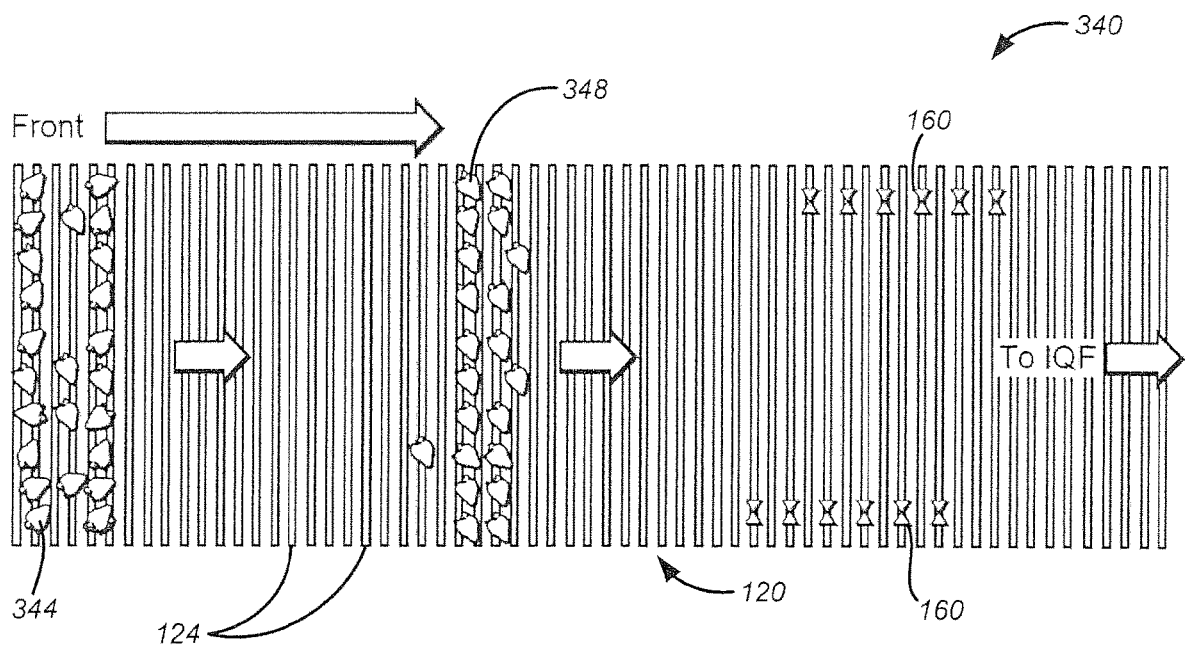
FIG. 14A illustrates a top plan view of an exemplary automated strawberry de-calyxing line according to the present disclosure.
Figure 14B:
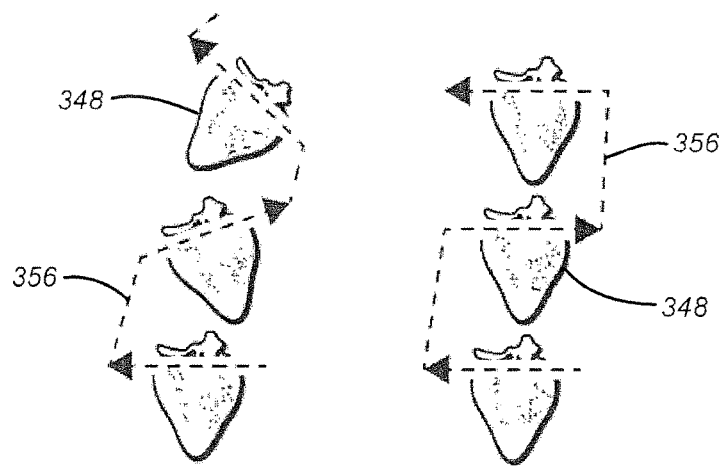
FIG. 14B illustrates exemplary separation paths for removal of calyxes from strawberries, in accordance with the present disclosure.

FIG. 14A illustrates a top view of an exemplary embodiment of an automated strawberry de-calyxing line 340 comprising the conveyor system 120 with a multiplicity of initially disorganized strawberries 344 disposed thereon. As the disorganized strawberries 344 are moved along on the conveyor system 120, the strawberries become aligned and oriented into a multiplicity of arranged strawberries 348 that are suitable for de-calyxing, as disclosed above. In the embodiment illustrated in FIG. 14A, the plurality of nozzles 160 comprises six X-Y mobile waterjets that are synchronized with the conveyor shaft encoders 212 and guided by a control computer 352 coupled with the calyx identification system 108, as best shown in FIG. 1A. Once the calyx identification system 108 identifies and registers the coordinates of the strawberries 348 and their respective calyx locations, the control computer 352 may direct the X-Y mobile waterjets 160 to follow a calculated cut pattern 356 or route across the width of the conveyor system 120. As shown in FIG. 14B, the calculated cut pattern 356 followed by each of the X-Y mobile waterjets 160 comprises the coordinates of the calyx of each strawberry laying on the conveyor system 120, regardless of the orientations of the strawberries. In some embodiments, the X-Y mobile waterjets 160 may travel in a slight angle following the conveyor motion, as synchronized by the conveyor shaft encoders 212, so as to accommodate the translation of the conveyor system 120.

Figure 15:
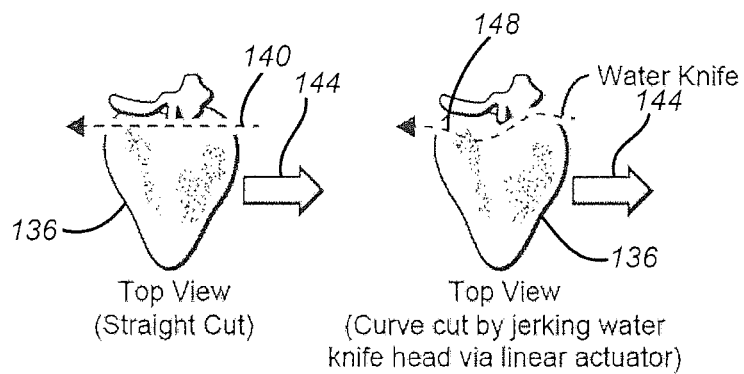
FIG. 15 illustrates exemplary calyx separation paths that may be performed on strawberries by way of either stationary or motional removal systems, in accordance with the present disclosure.

FIG. 15 illustrates exemplary separation paths that may be performed on a strawberry 136 by way of either stationary or motional removal systems, such as the calyx removal system 112. The cutting device may remain stationary during cutting to create a line 140 across the strawberry perpendicular to a direction of motion 144 of the strawberry as the strawberry is conveyed through the calyx removal system 112. Alternatively, the cutting device may translate during cutting such that a linear and/or a curved section 148 may be removed from the terminal end of the strawberry 136 in an attempt to preserve the most fruit remaining on the strawberry. For example, the cutting device may move inward toward the center of the strawberry 136 to remove more of the calyx along the center of the strawberry and move outward after passing the center of the strawberry to leave more of the fruit for freezing. The cutting device may also be oriented angularly such that a conical or other shaped cut may be made at the end of the strawberry 136. The calyx removal system 112 may be configured such that the strawberry 136 is traversing the calyx removal system while being cut or may be stationary during cutting, before being moved out of the calyx removal system. Thus, the conveyor system 120 and the calyx removal system 112 may operate in conjunction so as to determine a precise location and desired cutting path within the calyx removal system. The separation paths 140, 148 preferably are sharp and maintain a yield loss comparable to, or less than the presently used manual system.

As disclosed herein, a cutting system comprising mobile waterjets is used herein as an exemplary configuration. In other embodiments, however, many other impulse cutting schemes may be configured and implemented without using mobile waterjets. These cutting schemes may include rotation, linear, and stroke motional cuts controlled by the plurality of actuators 172 and one or more processors within the control computer 352 and/or the calyx identification system 108.

Moreover, it will be appreciated that the high-speed, high-pressure waterjets disclosed herein may be hazardous to human interference. Thus, a protective enclosure, such as glass, silicon-coated polycarbonate, metal, or other enclosure may provide a safety barrier to human users. Windows or access portals may be provided to facilitate viewing and/or provide access to an interior of the system. The access portals may comprise safety interlocks that automatically shut down the mobile waterjets, pumps, and the like, when opened. Once an intrusion is detected, therefore, the safety interlocks may automatically shut off the produce portion removal system 100.

The produce portion removal system 100 generally uses images or scans from the calyx identification system 108 to determine a location and/or orientation of the strawberry and/or calyx. The system 100 may also or alternatively determine a location and/or trajectory for the calyx removal system 112. The system 100 comprises hardware and/or software stored as non-transitory machine-readable language and executed by a processor to perform the desired location, orientation, and/or trajectory. As shown in FIGS. 1A-1B, control panels 360, 364 house the electronics necessary to control and drive the moving parts of the system 100. Adjustments may be programmed into the system 100 by an end-user so as to adapt to different strawberry varieties and/or configurations. The controls panels 360, 364 may further permit the end-user to adjust the calyx identification system 108 and cutting schemes. The control panels 360, 364 may, for example, include a touch screen that permits the end-user to set various parameters, such as cutting speed, cutting route schemes, and the like.

In some embodiments, the calyx identification system 108 and calyx removal system 112 may be integrated into a combined system. This integration may use one or more computer and/or one or more processors including, for example, an imaging processor to control the calyx identification system 108, including the camera 176, the loading system 104, including the rollers rods 124, and the calyx removal system 112, including the plurality of actuated nozzles 160. The combined system may track the coordinates of the roller rods 124, for example by way of the conveyor shaft encoders 212, analyze and detect the orientation and configuration of the strawberry to determine the coordinates of the calyx for removal through the detection of one or more images by way of the calyx identification system 108, and position and/or orient the nozzles 160, as well as pulse the nozzles to make a desired separation of the calyx from the strawberry in the calyx removal system 112. The combined system may include one or more input and output interfaces, including a user control and interface, an output control, interfaces between the machine controller, encode, any safety sensors, signal pre-processors, cameras, nozzle valves, nozzle actuators, and the like, without limitation.

Figure 16:
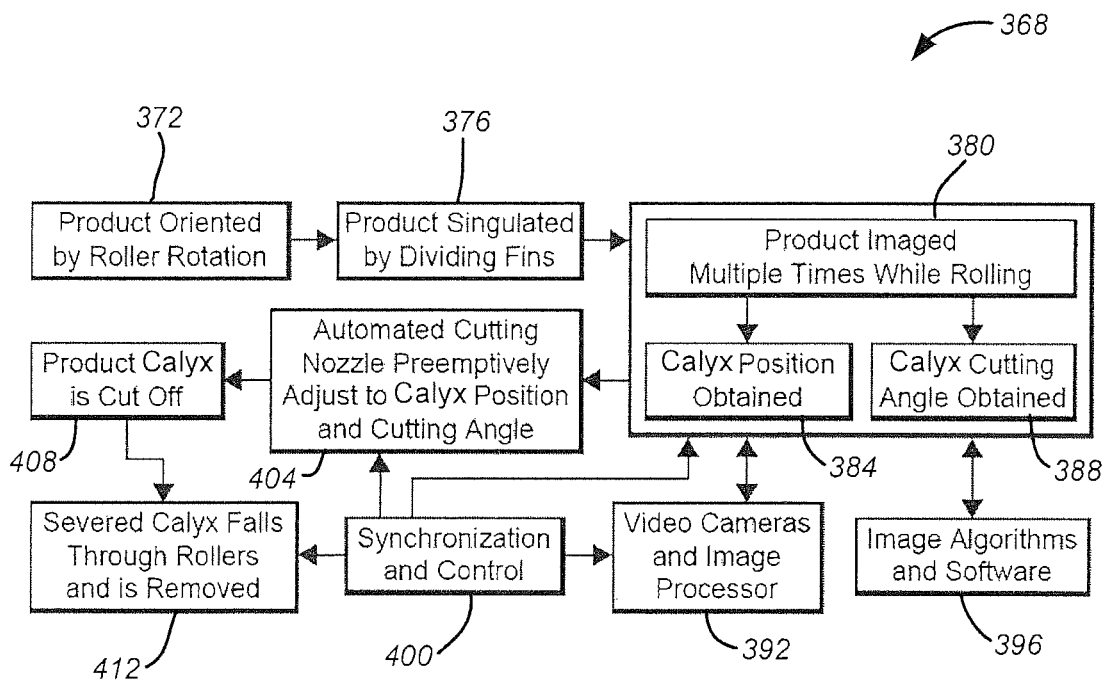
FIG. 16 is a flow chart illustrating an exemplary automated calyx removal process according to the present disclosure.

FIG. 16 is a flow chart illustrating an exemplary automated calyx removal process 368 according to the present disclosure. The process 368 begins at step 372 as strawberries are placed into the water tank 116 and then lifted from the water by the roller rods 124 of the conveyor system 120. In some embodiments, the strawberries may be separated into rows by one or more dividing fins 128, at a step 376. Spaces between adjacent roller rods 124 operate as valleys, such as the strawberry-shaped valleys 220 illustrated in FIG. 5B, that rotate and orient the strawberries desirably as they are transported by the conveyor system 120 to the calyx identification system 108.

In a step 380, the strawberries continuously rotate within the valleys while traversing the calyx identification system 108 so as to provide accurate data on each calyx position and an optimal cutting path that minimizes fruit loss. In an exemplary embodiment, the calyx identification system 108 comprises one or more industrial cameras 176 that take continuous and/or repetitious sequential images of the rolling strawberries. In steps 384 and 388 the calyx identification system 108 analyzes the images to respectively identify and locate the calyxes and determine an associated optimal cutting paths or angles that minimize fruit loss. One or more processors associated with the calyx identification system 108 or one or more processors associated with another part of the system, such as the calyx removal system 112, may utilize the data regarding the calyx locations, and/or strawberry location and/or orientation, and calculate or determine the optimal cutting paths or angles for the calyx removal system 112. The calyx identification system 108 comprises both hardware, including the video and/or still cameras and imaging processors 392, and/or one or more algorithm processors 396, as well as software stored on non-volatile machine readable medium and executed by one or more of the processors to perform the imaging algorithms and associated calculations.

As the strawberries leave the calyx identification system 108, and the locations and/or orientations of the strawberries have been determined, the rolling of the strawberries ceases and the strawberries are laterally traversed along the conveyor system 120 into the calyx removal system 112. The strawberries may be tracked by the conveyor shaft encoders 212, such that the calyx identification system 108 may register the position of each calyx (within, for example, approximately +/−0.25 mm) in coordinates.

While the strawberries traverse the calyx removal system 112, the calyx is removed from each strawberry. In a concurrent step 400, the calyx removal system 112 may be synchronized by the conveyor shaft encoders 212 to track the locations of the calyxes, while the plurality of actuators 172 use the coordinates obtained from the calyx identification system 108 and remove each calyx. The calyx removal system 112 may include any combination of different removal systems, such as mechanical, optical, hydro, and the like, without limitation. In a step 404, the actuators 172 may be orientated according to the calculations of the calyx identification system 108 so as to automate the cutting nozzles 160 and preemptively adjust to the calyx positions and cutting paths determined respectively in steps 384 and 388. The actuators 172 may then remove the calyxes from the strawberries in a step 408.

In a final step 412, the severed calyxes are removed from the system 100, for example by falling through the valleys 220 between the roller rods 124 and/or other spaces in the conveyor system 120 and removed by way of a discharge conveyor system 416, as shown in FIG. 1B. The calyx-free strawberries may then be conveyed onto further processing, such a freeze drying. Further, in some embodiments, one or more sensors may be included on an output side of the calyx removal system 112 and configured to detect and/or remove any strawberries that retain any or all of their calyx or have any other blemished attributes that may be caused by the system 100.

Exemplary embodiments as described herein are generally in terms of strawberries that are automatically oriented and/or located by the produce portion removal system 100. Therefore, if strawberries are of abnormal size or shape, such as double coned or substantially flat, the produce portion removal system 100, as described, may not properly orient the strawberries. The portion removal system 100 may be configured to respond to these strawberries in a number of ways. For example, the calyx identification system 108 may be configured to identify the strawberries not properly oriented and/or configured. Abnormally oriented strawberries may be removed by way of a removal mechanism, a separation mechanism, or a separate conveyor to be processed by other methods, such as by hand.

In some embodiments, the produce portion removal system 100 may recognize abnormally oriented strawberries, and differently orient and/or actuate the calyx removal system 112 to accommodate these strawberries and still permit proper calyx removal. The calyx identification system 108, for example, may not require orientation of the strawberries. Therefore, the differently shaped or sized strawberries may be processed by a configuration in which the calyx identification system 108 and calyx removal system 112 work without the associated rotation and/or orientation of the strawberries. For example, the calyx identification system 108 may be comprised of one or more cameras 176 disposed within an interior of the calyx removal system 112 to provide multiple angled images of the same strawberry, thus replacing the rotation of the strawberry, as described above, to obtain a semi-complete image of the strawberry for recognizing the calyx. The calyx removal system 112 may then be configured to move the nozzles 160 to a starting separation location and traverse or angle the nozzle to an ending separation location accounting for the translation of the strawberry, if any, through the system. Thus, the calyx identification system 108 may be configured to determine an entire separation path between the calyx and the strawberry so as to initiate the separation and utilize the translation of the conveyor system 120 to complete the separation. Therefore, the strawberry may be oriented in any configuration in which the calyx is on any lateral side of the strawberry, and the separation may be achieved at any lateral or angular orientation as necessary.

Embodiments as described herein may reduce labor time and costs in the fields by removing the calyx pre-processing by manual labor. Moreover, worker safety and therefore worker availability may be improved. Workers may be more easily found as they will not have to work with sharp and unsafe equipment. As will be recognized, pay incentive for field workers generally dictates faster production, thus potentially incentivizing unsafe or inefficient use of cutting tools, thereby reducing worker safety. Therefore, by removing manual calyx pre-processing from the fields, the overall safety of the workers improves. Sanitation of the cutting implements and fruit may also be improved as the cutting is removed from outside, uncontrolled, generally warm conditions, and performed in facilities that are regularly available to cleaning. Moreover, the speed of calyx processing may be greatly increased, and the field-to-freezer time may be greatly reduced. A reduction in calyx processing costs, higher throughput, increased fruit yield, improved worker safety, and other considerations may also competitively improve upon taking advantages of embodiments disclosed herein.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

While the invention has been described in terms of particular variations and illustrative figures, those of ordinary skill in the art will recognize that the invention is not limited to the variations or figures described. In addition, where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially as described above. To the extent there are variations of the invention, which are within the spirit of the disclosure or equivalent to the inventions found in the claims, it is the intent that this patent will cover those variations as well. Therefore, the present disclosure is to be understood as not limited by the specific embodiments described herein, but only by scope of the appended claims.

What is claimed is:

1. A removal system for removing portions of produce, comprising:
   a loading system for introducing the produce into the removal system;
   a conveyor system for transporting the produce through the removal system;
   an identification system for locating the portions to be removed; and
   a cutting system for removing the portions from the produce;
   wherein the conveyor system is configured to rotate and orient the produce during transport; and
   wherein the conveyor system is configured to cease rotating the produce once the orientations of the portions to be removed are identified.

2. The removal system of claim 1, wherein the cutting system comprises a plurality of actuated cutting nozzles.

3. The removal system of claim 1, wherein the conveyor system includes a plurality of roller rods configured to lift the produce from the loading system and transport the produce through the removal system.

4. The removal system of claim 3, wherein each of the plurality of roller rods comprises a shaped roller for rotating and orienting the produce during transport.

5. The removal system of claim 3, wherein the identification system includes one or more industrial cameras for taking sequential images of the rotating produce to determine an optimal cutting path.

6. The removal system of claim 5, wherein the conveyor system is configured to cease rotating the produce once the optimal cutting path is determined.

* * * * *